Oct. 30, 1962   L. E. BOWMAN   3,061,195
FLUID MIXING DEVICE
Filed Jan. 29, 1960   3 Sheets-Sheet 1

INVENTOR.
LAWRENCE E. BOWMAN
BY
*William Frederick Werner*
ATTORNEY

Oct. 30, 1962    L. E. BOWMAN    3,061,195
FLUID MIXING DEVICE
Filed Jan. 29, 1960    3 Sheets-Sheet 2

INVENTOR.
LAWRENCE E. BOWMAN
BY William Frederick Werner
ATTORNEY

Oct. 30, 1962  L. E. BOWMAN  3,061,195
FLUID MIXING DEVICE

Filed Jan. 29, 1960  3 Sheets-Sheet 3

INVENTOR.
LAWRENCE E. BOWMAN
BY
William Frederick Werner
ATTORNEY 3,061,195
Patented Oct. 30, 1962

3,061,195
FLUID MIXING DEVICE
Lawrence E. Bowman, Warwick, R. I., assignor to Leonard Valve Company, Cranston, R. I., a corporation of Rhode Island
Filed Jan. 29, 1960, Ser. No. 5,440
6 Claims. (Cl. 236—12)

This invention relates to a device for mixing two streams of fluid at different temperatures, for example a stream of cold water and a stream of hot water or steam, to provide a mixture having a predetermined temperature.

Devices of this kind are well known. Each device includes a flow control valve to and through which both fluid streams are fed. The valve is adapted to select the relative proportions of the two fluids in the final mixture. The valve is actuated or operated by a thermally sensitive unit which is influenced by the temperature of the mixture, so that, should the said temperature of the mixture depart from its predetermined value, the thermally sensitive unit actuates the valve to vary the relative proportions and restore the mixture to the predetermined temperature.

A principal object of the present invention is to enable the valve to be dismantled from a housing fixed in a wall, for factory servicing and replacement, and be reassembled in the housing quickly and easily by ordinary mechanics.

Another object of the present invention is to prevent the thermally sensitive unit from damage during the dismantling, shipping, and reassembling of the valve.

A further object of the present invention is to ensure that when the valve is being reassembled in the housing, it cannot be fitted incorrectly so that the dismantling and reassembling may be effected by unskilled persons.

Still another object of the present invention is to ensure that during the reassembling operations, the factory setting of the thermally sensitive unit is not disturbed inadvertently.

And still another object of the present invention is to enable the component parts of the housing, in which the valve and thermally sensitive unit are housed, to be produced as a metal die-casting of minimum overall dimensions and thereby minimize the number of machine operations involved in the production of the housing, with consequent reductions in manufacturing costs.

Other objects of the present invention will become apparent in part and be pointed out in part in the following specification and claims.

Referring to the drawings, in which similar reference characters refer to similar parts in all the views.

Figure 1:
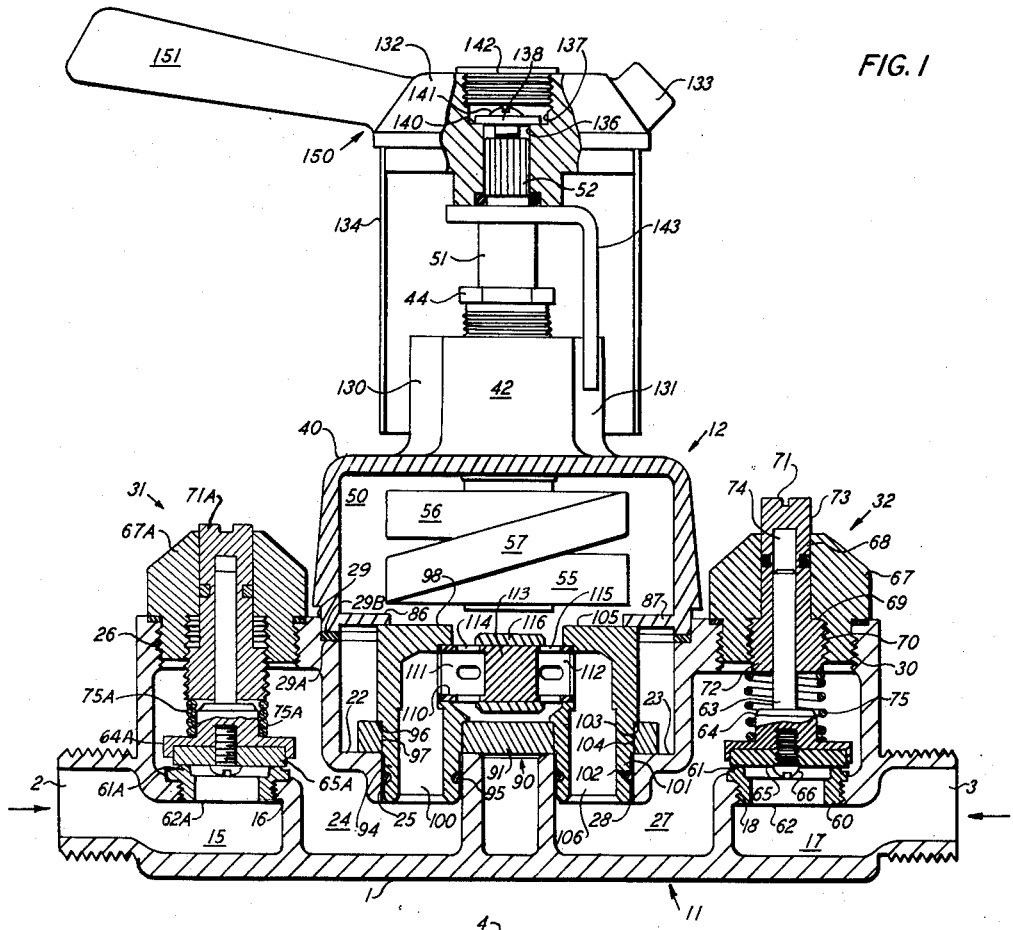
FIGURE 1 is a vertical sectional view taken substantially upon the centerline of the new and improved fluid mixing device.

The present fluid mixing device consists of two parts, a housing, generally indicated by reference character 11 and the control unit, generally indicated by reference character 12. The housing 11 is normally secured in a wall. Housing 11 may be fastened to a wall joist and then covered with plaster, wall board or the like, in a manner to permit control unit 12 to be exposed to view and operation.

Figure 2:
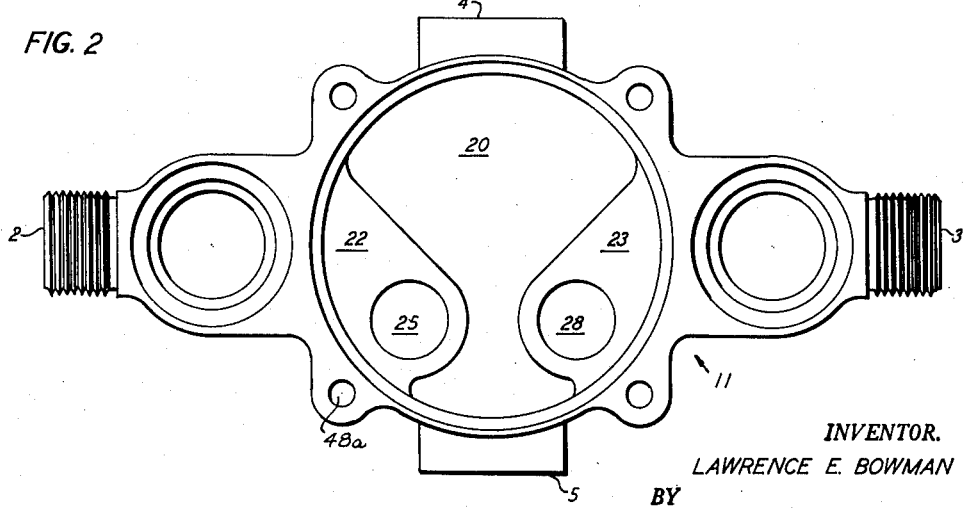
FIGURE 2 is a plan view of the housing.
Figure 5:
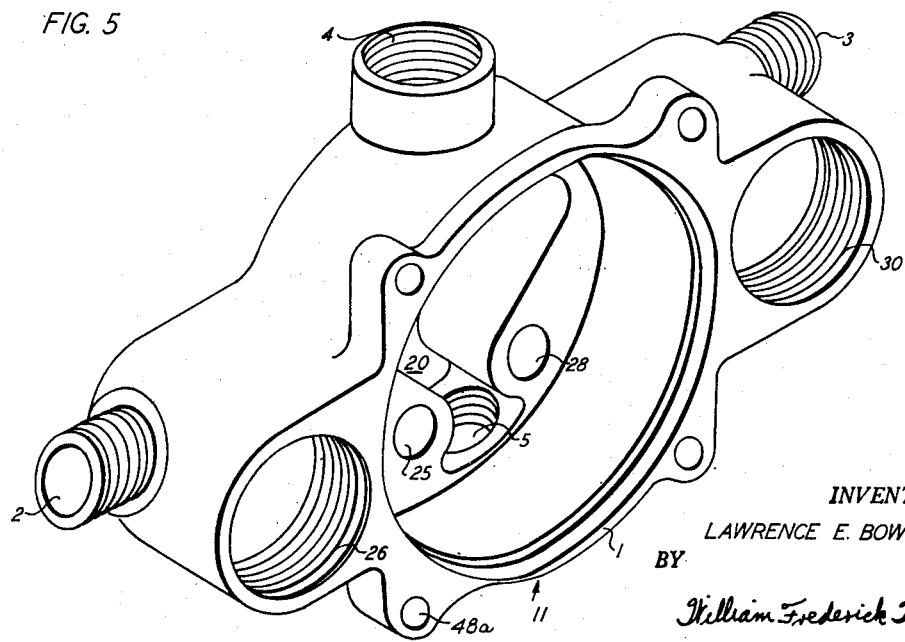
FIGURE 5 is a perspective view of the housing.
Figure 6:
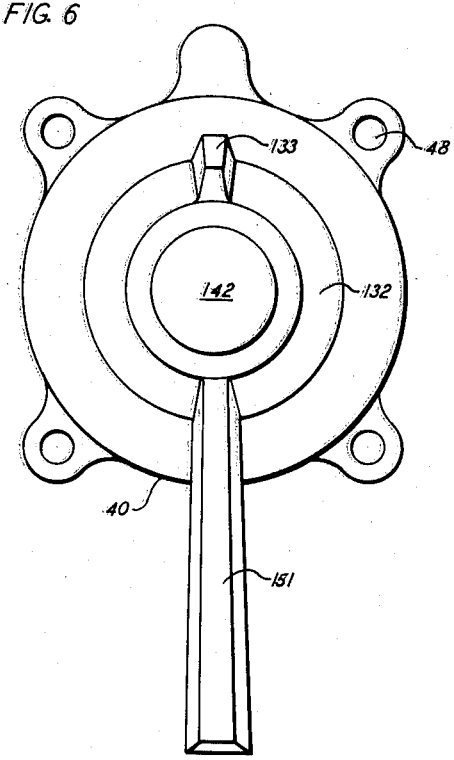
FIGURE 6 is a plan view of the control unit.
Figure 7:
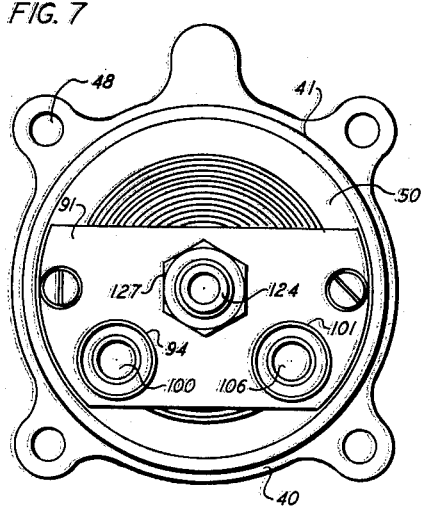
FIGURE 7 is a front elevational view of FIGURE 3.
Figure 8:
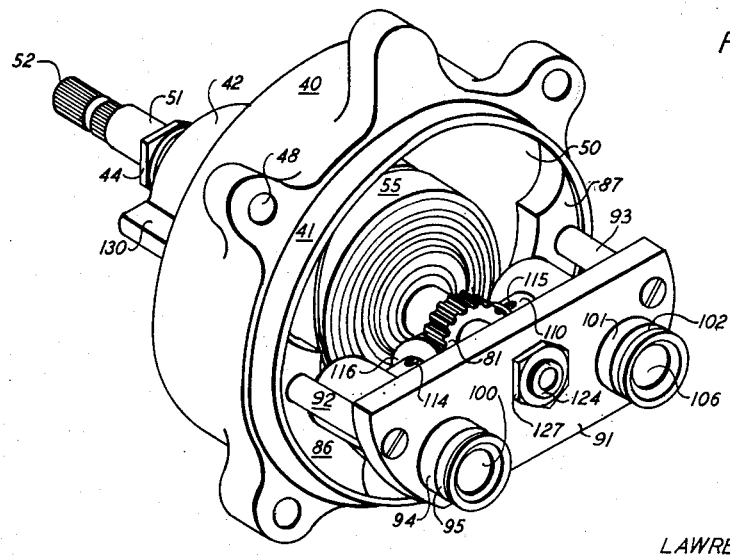
FIGURE 8 is a perspective view of FIGURE 3.

Housing 11 consists of a casting, cored to provide a controlled circuitous path for the various streams of water. Referring to FIGURES 1, 2 and 5; there is shown housing 11 consisting of a cup-shaped base 1, which is formed with two co-axial and diametrically opposed inlets 2 and 3, and with two co-axial diametrically opposed mixture discharge outlets 4 and 5. The axis of the inlets are located at right angles to the axis of the outlets. The inlets and outlets are tapped, so that a cold water supply pipe may be connected into the inlet 2. A hot water or steam supply pipe may be connected into the inlet 3. A mixture discharge pipe may be connected into either of the outlets 4 or 5, and a closure plug may be connected into the other outlet.

Inlet 2 consists of a passageway 15 having a lower threaded area or port 16. Cup-shaped base 1 is provided with a chamber 20 having flanged seats 22, 23. A cold water chamber 24 is provided in base 1 with an outlet port 25 located in flanged seat 22. An upper threaded port 26 aligned with lower threaded port 16 is located in base 1.

A hot water chamber 27 is provided in base 1 with an outlet port 28 located in flanged seat 23. An upper threaded port 30 aligned with lower threaded area or port 18 is located in base 1.

A cold water check and shut off valve, generally indicated by reference numeral 31 is located and secured in upper and lower threaded ports 26, 16. A hot water check and shut off valve, generally indicated by reference numeral 32 is located and secured in upper and lower threaded ports 30, 18.

Check valves 31, 32 prevent water from flowing from chamber 24 to passageway 15 and from chamber 27 to passageway 17, respectively. They also serve the function of shutting off or stopping the water supply from inlets 2 and 3 when the control unit 12 is removed from housing 11.

Check valves 31, 32 are identical in construction and function. Check valve 32 consists of a threaded insert 60 provided with a valve seat 61 and an axial port 62. Threaded insert 60 is rotatively secured in lower threaded port 18. A valve stem 63 integrally provided with a head 64 having gasket or washer 65 secured thereto by means of a screw 66 is axially aligned over axial port 62 with gasket 65 engaging valve seat 61. A cap 67 provided with an axial passageway 68 having a shoulder 69 and threads 70 is rotatively secured in upper threaded port 30 in a fluid tight relationship. An adjustable nut 71 provided with a head 72, a shank 73 and an axial core 74 is rotatively mounted in axial passageway 68 by means of threads engaging threads 70 and a projection which engages shoulder 69. Valve stem 63 is slidingly mounted in axial core 74. A spring 75 is interposed between head 72 and head 64. Spring 75 yieldingly urges gasket 65 against valve seat 61, so that fluid under pressure entering inlet 3 and passing through passageway 17 will force valve stem upwardly, against the tension of spring 75 to allow the fluid to pass from axial port 62 into water chamber 27. If the fluid mixing device is shut off as will presently appear, the water in chamber 27 will equalize in pressure with the force of the water in passageway 17, thereby, allowing spring 75 to force gasket 65 against valve seat 61 to stop the flow of fluid through axial passageway 62. However, if it is desired to permanently stop the flow of fluid through axial passageway 62, adjustable nut 71 may be rotated until the bottom of axial core 74 engages the top of valve stem 63, thereby holding gasket 65 against valve seat 61.

Check and shut off valve 31 is identical in construction and operation with check and shut off valve 32. It consists of a cap 67A, an adjustable nut 71A, head 64A, gasket 65A, valve seat 61A and spring 75A. It is shown in position to permanently stop the flow of fluid from passageway 15 to chamber 24.

Control unit 12 (see FIGS. 1, 3 and 4) consists of a cup-shaped cover 40 provided with a circular seat 41 and an extension 42, centrally recessed to receive a packing 43 and an externally threaded gland 44. Cover 40 is flanged to provide bolt holes 48. Cup-shaped cover 40 provides a water mixing chamber 50. A spindle 51 provided with a splined end 52 and an enlarged end 53 is rotatively mounted in extension 42, packing 43 and gland 44.

A bimetallic element is provided in the form of a bimetal strip wound in a coil, starting at the core end and rotating clockwise, outwardly, until a predetermined diameter is reached. The other end of the bimetal strip is wound, starting at a core, in a counter-clock wise direction, until a second coil of approximately the same diameter is reached, thereby providing two coils 55, 56 having a common connecting strip or cross over 57. The inner or core end of coil 56 is secured to enlarged end 53 by means of a slot 58.

A valve actuating member, generally indicated by reference character 80, is provided with a toothed pinion 81 on one end and an enlarged head 82 having a shoulder 83 on the other end. The inner or core end of coil 55 is secured to enlarged head 82 by means of a slot 84. The outside edge of the innermost convolutions of coil 55 abut shoulder 83. Valve actuating member 80 is provided with an axial core 125 for purposes which will presently appear.

Part of the construction novelty of the present invention resides in a bridge support for the cold water and hot water control valve extensions. Cup-shaped cover 40 is provided with oppositely located flanges 86, 87. The bridge, generally indicated by reference character 90, consists of a front bracket 91, a left side arm 92 secured to flange 86 and a right side arm 93 secured to flange 87, as viewed in FIGURE 3. Front bracket 91 may be secured on opposite ends to left side arm 92 and right side arm 93, respectively, or the arms and bracket may be integrally formed. In either construction they form an integral unit.

A cold water valve extension 94 is provided with an O ring 95 in the outboard end and a shoulder 96 midway of its length. Front bracket 91 is provided with an orifice 97. Valve extension 94 is supported in orifice 97 with shoulder 96 abutting front bracket 91. The base 98 of valve extension 94 abuts flange 86, thereby securing valve extension 94 in bridge 90. Valve extension 94 is provided with a port 100 having a right angle bend.

A hot water valve extension 101 is provided with an O ring 102 in the outboard end and a shoulder 103 midway of its length. Front bracket 91 is provided with a second orifice 104. Valve extension 101 is supported in orifice 104 with shoulder 103 abutting front bracket 91. The base 105 of valve extension 101 abuts flange 87, thereby securing valve extension 101 in bridge 90. Valve extension 101 is provided with a port 106, which is axially aligned with the port 100.

A valve sleeve 110 is provided with a left side axial orifice 111 and a right side axial orifice 112 separated by a medial wall 113, as viewed in FIGURE 1. A plurality of ports 114 are located in valve sleeve 110 and communicate with axial orifice 111. A plurality of ports 115 are located in valve sleeve 110 and communicate with axial orifice 112. A thimble 116 provided with rack teeth 117 is slidably mounted upon valve sleeve 110. The teeth of pinion 81 engage rack teeth 117 to slide thimble 116 along valve sleeve 110.

A stud 120 provided with a bearing 121 in one end, a bearing 122, a shoulder 123 and a threaded end 124 partially positioned in axial core 125 in a manner to cause bearings 121 and 122 to rotatively support valve actuating member 80 with shoulder 123 interposed between the end of pinion 81 and front bracket 91. Front bracket 91 is provided with a third orifice 126 which supports threaded end 124. A nut 127 rotatively mounted upon threaded end 124 fixes stud 120 to front bracket 91.

Extension 42 is provided with indicator stops in the form of ribs 130, 131. A temperature indicating handle, generally indicated by reference character 150 is provided, consisting of a handle 151, a circular frame 132 and a pointer 133. A skirt 134 is fastened to circular frame 132 by means of brazing, soldering, welding, etc. Skirt 134 is provided for aesthetic appearance and for covering extension 42, spindle 51 and gland 44. Circular frame 132 is provided with an axial bore 136 and an enlarged bore 137. Axial bore 136 is driven over splined end 52 to be thereby removably secured thereto. A washer 138 engages a ledge 140 formed between axial bore 136 and enlarged bore 137 and is retained in that position by means of screw 141 which rotatively engages a threaded area in the end of splined end 52. A plug 142 is removably secured in enlarged bore 137 for aesthetic reasons. A limiting or stop bracket 143 is secured to splined end 52 and is provided to engage ribs 130, 131, thereby limiting the rotation of temperature indicating handle 150.

Figure 4:
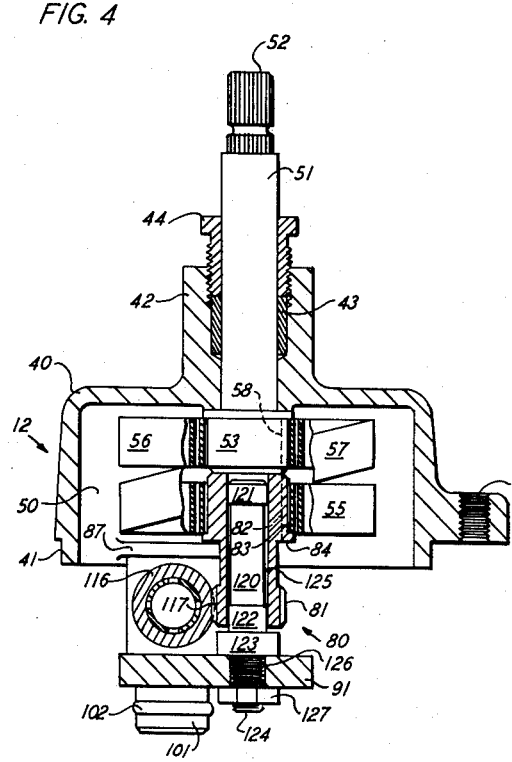
FIGURE 4 is a transverse cross sectional view taken along line 4—4 of FIGURE 3.
Figure 3:
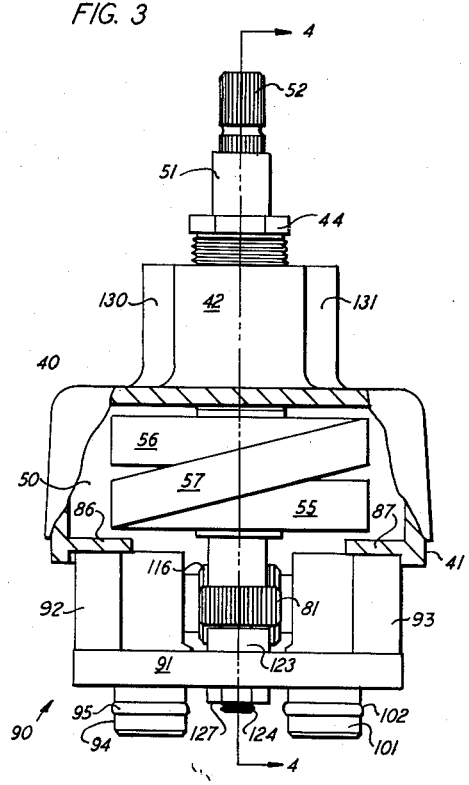
FIGURE 3 is a side elevational view, partly broken away of the valve and the thermally sensitive unit.

It will be noted that the control unit 12, FIGURES 3 and 4, is self-contained and transportable. Housing 11, FIGURES 2 and 5, is a separate unit which may be fixed to a shower stall wall and be connected to a supply of cold water through inlet 2, a hot water supply through inlet 3 and to a shower nozzle pipe through outlet 4, A shower on-off valve will be located in the shower nozzle pipe. A plug will be located in outlet 5.

Check and shut off valves 31, 32 may be located in lower threaded ports 16, 18, respectively, as previously described with both valves 31, 32 pre-set in the position illustrated for valve 32 in FIGURE 1.

Control unit 12 will be assembled with housing 11 when valve extensions 94, 101 are inserted into outlet ports 25, 28, respectively, in a manner as illustrated in FIGURE 1, with circular seat 41 engaging wall 29 and flanged seat 29A. A packing or ring washer 29B may be interposed between the base of circular seat 41 and flanged seat 29A. Tapped holes 48 will be aligned with bolt holes 48A. Bolts, not shown will secure cover 40 to housing 11.

Thus it will be seen, that the bolts in holes 48, 48A may be removed, permitting control unit 12 to be physically detached from housing 11, thereby permitting control unit 12 to be shipped to the factory for repairs or adjustment. It is equally evident, that any unskilled person may tighten or loosen the bolts to assembly or disassemble control unit 12 from housing 11.

In operation, when assembled, handle 151 will be rotated to a selected position indicating the temperature of the water desired at the shower nozzle or at outlet 4. Rotation of handle 151 will rotate spindle 51 and thereby pre-set coils 55, 56. The on-off valve in the shower line will be turned on. Cold water will flow into inlet 2, through passageway 15, axial port 62A, chamber 24, port 100, axial orifice 111, the plurality of ports 114 into mixing chamber 50. Simultaneously, hot water will flow into inlet 3, through passageway 17, axial port 62, chamber 27, port 106, axial orifice 112, plurality of ports 115 into mixing chamber 50. Both the cold water and the hot water will mix in chamber 50. The temperature of the water will influence coil 55. If the temperature of the water differs from the temperature setting in coil 55, coil 55 will react by rotating one way or the other, thereby rotating valve actuating member 80. Toothed pinion 81 through teeth 117 will slide thimble 116 to the right or left as viewed in FIG. 1, thereby blocking or unblocking ports 114 and 115. Thus the flow of hot or cold water into mixing chamber 50 is controlled.

It becomes evident in viewing FIGURE 1 that packings 95, 102, and 29B provide water tight seals at the respective locations. Having shown and described a preferred embodiment of the present invention, by way of example, it should be realized that structural changes could be made and other examples given without departing from either the spirit or scope of this invention.

What I claim is:

1. A fluid mixing device comprising a housing and a control unit, means to attach and detach said control unit from said housing, said housing consisting of a base provided with a cold water inlet, a chamber, a hot water inlet, and a mixture discharge outlet, said control unit consisting of a cover having a water mixing chamber, a spindle rotatively mounted in said cover, a bimetallic temperature responsive element consisting of two attached coils and located in said water mixing chamber, means securing an end of one coil of said bimetallic temperature responsive element to said spindle, a valve sleeve provided with a cold water valve extension and a hot water valve extension, a bridge, means securing said bridge to said cover, means securing both said cold water and said hot water valve extension to said bridge, a thimble slidably mounted upon said valve sleeve, a valve actuating member, a stud, means securing one end of said stud to said bridge, said valve actuating member being supported by said stud, means securing an end of the other of said two attached coils of said bimetallic temperature responsive element to said valve actuating member, means attaching said valve actuating member to said thimble, said cold water valve extension engageable and disengageable with said cold water inlet, said hot water valve extension engageable and disengageable with said hot water inlet, said water mixing chamber and said first mentioned chamber attachable and detachable as mating chambers.

2. A fluid mixing device comprising a housing and a control unit attachable and detachable with said housing, said housing consisting of a cup-shaped base provided with a cold water inlet and a co-axial and diametrically opposed hot water inlet and two co-axial diametrically opposed mixture discharge outlets, the axis of said cold water and hot water inlets located at right angles to the axis of said mixture discharge outlets, said cold water inlet having a passageway provided with a threaded port, said hot water inlet having a passageway provided with a threaded port, said cup-shaped base provided with two flanged seats and a chamber, an outlet port in each flanged seat, a cold water chamber in said cup-shaped base in communication with the cold water threaded port, a hot water chamber in said cup-shaped base in communication with the hot water threaded port, a cold water check and shut off valve secured in the cold water threaded port, a hot water check and shut off valve secured in the hot water threaded port, said control unit consisting of a cup-shaped cover having a circular seat, a flange provided with bolt holes and an extension provided with a central recess, a spindle having a splined end rotatively mounted in said central recess, a bimetallic element consisting of two attached coils, means securing the end of one coil to said spindle, a bridge consisting of a front bracket and a left side arm and a right side arm, means securing one end of said left side arm and one end of said right side arm to said cover, means securing the other end of said left side arm to one end of said front bracket, means securing the other end of said right side arm to the opposite end of said front bracket, a stud, means securing said stud ot said front bracket, a valve actuating member provided with a toothed pinion rotatively mounted upon said stud, means securing an end of said coil to said actuating member, a valve sleeve provided with a cold water axial orifice and a hot water axial orifice, a medial wall in said sleeve separating said cold water axial orifice from said hot water axial orifice, a first plurality of ports in said valve sleeve in communication with said cold water axial orifice, a second plurality of ports in said valve sleeve in communication with said hot water axial orifice, a cold water valve extension having a cold water port, means securing said cold water valve extension to said front bracket, a hot water valve extension having a port, means securing said hot water valve extension to said front bracket, means securing said valve sleeve on one end to said cold water valve extension with said cold water port in communication with said cold water axial orifice, and on the other end to said hot water valve extension with said hot water port in communication with said hot water axial orifice, and a thimble provided with a tooth rack in permanent engagement with said toothed pinion and slidably mounted upon said valve sleeve, whereby rotation of said coil rotates said valve actuating member to slide said thimble back and forth across said first and second plurality of ports to block and unblock said hot and cold water ports to alter the flow of hot and cold water flowing into said mixing chamber.

3. A fluid mixing device comprising a housing and a control unit, means to attach and detach said control unit from said housing, said housing consisting of a base provided with two flanged seats, and a chamber, a cold water port in one flanged seat, a hot water port in the other flanged seat, a cold water inlet in said base in communication with said cold water port, a hot water inlet in said base in communication with said hot water port, and a mixture discharge outlet in said base and in communication with said chamber, said control unit consisting of a cover having a water mixing chamber, a spindle rotatively mounted in said cover, a bimetallic temperature responsive element provided with an upper end and a lower end located in said water mixing chamber, means securing said upper end of said bimetallic temperature responsive element to said spindle, a valve sleeve provided with a cold water axial orifice and a hot water axial orifice, a medial wall in said sleeve separating said cold water axial orifice from said hot water axial orifice, a plurality of cold water ports in said valve sleeve in communication with said cold water axial orifice, a plurality of hot water ports in said valve sleeve in communication with said hot water axial orifice, a cold water valve extension having a cold water port in communication with said cold water axial orifice, a hot water valve extension having a hot water port in communication with said hot water axial orifice, a bridge, means to secure said bridge to said cover, means to secure both said cold water and said hot water valve extension to said bridge, a thimble reciprocatingly mounted upon said valve sleeve, a valve actuating member, means securing said lower end of said bimetallic temperature responsive element to said valve actuating member, means attaching said valve actuating member to said thimble, said bridge engageable and disengageable with said two flanged seats with said cold water valve extension located in said cold water port and said hot water valve extension located in said hot water port, and said water mixing chamber aligned and in communication with the chamber in said housing, whereby said bimetallic temperature responsive element reacting to the temperature in said water mixing chamber reciprocates said thimble across the plurality of hot and the plurality of cold water ports in said valve sleeve to block and unblock said hot and cold water ports to alter the flow of hot and cold water flowing into said mixing chamber.

4. A fluid mixing device comprising a housing and a control unit, means to attach and detach said control unit from said housing, said housing consisting of a base provided with two flanged seats and a chamber, a cold water port in one flanged seat, a hot water port in the other flanged seat, a cold water inlet in said base in communication with said cold water port, a hot water inlet in said base in communication with said hot water port, and a mixture discharge outlet in said base and in communication with said chamber, said control unit consisting of a cover having a water mixing chamber, a spindle rotatively mounted in said cover, a bimetallic temperature responsive element provided with an upper end and a lower end located in said water mixing chamber, means securing said upper end of said bimetallic temperature responsive element to said spindle, a valve sleeve provided with a cold water axial orifice and a hot water axial orifice, a medial wall in said sleeve separating said cold water axial orifice from said hot water axial orifice, a plurality of cold water ports in said valve sleeve in communication with said cold water axial orifice, a plurality of hot water ports in said valve sleeve in communication with said hot water axial orifice, a cold water valve extension having a cold water port in communication with said cold water axial orifice, a hot water valve extension having a hot water port in communication with said hot water axial orifice, a bridge, means to secure said bridge to said cover, means to secure both said cold water and said hot water valve extensions to said bridge, a thimble reciprocatingly mounted upon said valve sleeve, a valve actuating member, a stud fixed to said bridge, said stud supporting rotation of said valve actuating member, means securing said lower end of said bimetallic temperature responsive element to said valve actuating member, means attaching said valve actuating member to said thimble, said bridge engageable, and disengageable with said two flanged seats with said cold water valve extension located in said cold water port and said hot water valve extension located in said hot water port, and said water mixing chamber aligned and in communication with the chamber in said housing, whereby said bimetallic temperature responsive element reacting to the temperature in said water mixing chamber partially rotates said valve actuating member to reciprocate said thimble across the plurality of hot and the plurality of cold water ports in said valve sleeve to block and unblock said hot and cold water ports to alter the flow of hot and cold water flowing into said mixing chamber.

5. A fluid mixing device comprising a housing and a control unit, bridge means to attach and detach said control unit from said housing, said housing consisting of a base provided with two flanged seats and a chamber, a cold water port in one flanged seat, a hot water port in the other flanged seat, a cold water inlet in said base in communication with said cold water port, a hot water inlet in said base in communication with said hot water port, and a mixture discharge outlet in said base and in communication with said chamber, said control unit consisting of a cover having a water mixing chamber, a spindle rotatively mounted in said cover, a bimetallic temperature responsive element provided with an upper end and a lower end located in said water mixing chamber, means securing said upper end of said bimetallic temperature responsive element to said spindle, a valve sleeve provided with a cold water axial orifice and a hot water axial orifice, a medial wall in said sleeve separating said cold water axial orifice from said hot water axial orifice, a plurality of cold water ports in said valve sleeve in communication with said cold water axial orifice, a plurality of hot water ports in said valve sleeve in communication with said hot water axial orifice, a cold water valve extension having a cold water port in communication with said cold water axial orifice, a hot water valve extension having a hot water port in communication with said hot water axial orifice, a thimble reciprocatingly mounted upon said valve sleeve, a valve actuating member, means securing said lower end of said bimetallic temperature responsive element to said valve actuating member, means attaching said valve actuating member to said thimble, a stud mounted in said bridge means for supporting said valve-activating member in said cover, said cold water valve extension removably secured in said cold water port and said hot water valve extension removably secured in said hot water port, and said water mixing chamber aligned and in communication with the chamber in said housing, whereby said bimetallic temperature responsive element reacting to the temperature in said water mixing chamber reciprocates said thimble across the plurality of hot and the plurality of cold water ports in said valve sleeve to block and unblock said hot and cold water ports to alter the flow of hot and cold water flowing into said mixing chamber.

6. A fluid mixing device comprising a housing and a control unit, means to attach and detach said control unit from said housing, said housing consisting of a cup-shaped base having two flanged seats and a chamber, a cold water port in one flanged seat, a hot water port in the other flanged seat, a cold water inlet in said base in communication with said cold water port, a hot water inlet in said base in communication with said hot water port, said cold water port and said hot water port being co-axial and diametrically opposed, a mixture discharge outlet in said base in communication with said chamber, the axis of said mixture discharge outlet being at right angles to said cold water inlet, a threaded area in said housing aligned with said cold water inlet and said cold water port, a cold water check and shut-off valve secured in said threaded area, a second threaded area in said housing aligned with said hot water inlet and said hot water port, a hot water check and shut-off valve secured in said second threaded area, said control unit consisting of a cover having a water mixing chamber, a spindle rotatively mounted in said cover, a bimetallic temperature responsive element provided with an upper end and a lower end located in said water mixing chamber, means securing said upper end of said bimetallic temperature responsive element to said spindle, a valve sleeve provided with a cold water axial orifice and a hot water axial orifice, a medial wall in said sleeve separating said cold water axial orifice from said hot water axial orifice, a plurality of cold water ports in said valve sleeve in communication with said cold water axial orifice, a plurality of hot water ports in said valve sleeve in communication with said hot water axial orifice, a cold water valve extension having a cold water port in communication with said cold water axial orifice, a hot water valve extension having a hot water port in communication with said hot water axial orifice, a bridge, means to secure said bridge to said cover, means to secure both said cold water and said hot water valve extensions to said bridge, a thimble reciprocatingly mounted upon said valve sleeve, a valve actuating member, means securing said lower end of said bimetallic temperature responsive element to said valve actuating member, means attaching said valve actuating member to said thimble, said bridge engageable, and disengageable with said two flanged seats with said cold water valve extension located in said cold water port and said hot water valve extension located in said hot water port, and said water mixing chamber in communication with the chamber aligned and in said housing, whereby said bimetallic temperature responsive element reacting to the temperature in said water mixing chamber reciprocates said thimble across the plurality of hot and the plurality of cold water ports in said valve sleeve to block and unblock said hot and cold water ports to alter the flow of hot and cold water flowing into said mixing chamber.

References Cited in the file of this patent

UNITED STATES PATENTS

| | | |
|---|---|---|
| 1,930,590 | Ebinger | Oct. 17, 1933 |
| 2,199,129 | Hamilton | Apr. 30, 1940 |
| 2,250,815 | Ruegg et al. | July 29, 1941 |
| 2,742,923 | Show | Apr. 24, 1956 |
| 2,839,247 | Jorgensen | June 17, 1958 |

FOREIGN PATENTS

| | | |
|---|---|---|
| 732,648 | Great Britain | June 29, 1955 |